US012267318B2

(12) United States Patent
Moncomble

(10) Patent No.: US 12,267,318 B2
(45) Date of Patent: Apr. 1, 2025

(54) METHOD AND SYSTEM FOR SECURING OPERATIONS AND ASSOCIATED USER STATION

(71) Applicant: Orange, Issy-les-Moulineaux (FR)

(72) Inventor: Ghislain Moncomble, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 395 days.

(21) Appl. No.: 17/416,114

(22) PCT Filed: Dec. 4, 2019

(86) PCT No.: PCT/FR2019/052926
§ 371 (c)(1),
(2) Date: Jun. 18, 2021

(87) PCT Pub. No.: WO2020/128203
PCT Pub. Date: Jun. 25, 2020

(65) Prior Publication Data
US 2022/0078183 A1    Mar. 10, 2022

(30) Foreign Application Priority Data
Dec. 21, 2018  (FR) ........................... 1874079

(51) Int. Cl.
*H04L 9/40*    (2022.01)
*G06Q 20/38*    (2012.01)

(52) U.S. Cl.
CPC ....... *H04L 63/0838* (2013.01); *G06Q 20/385* (2013.01); *H04L 63/062* (2013.01); *H04L 63/0861* (2013.01)

(58) Field of Classification Search
CPC .............. G06Q 20/385; H04L 63/061; H04L 63/062; H04L 63/067; H04L 63/0838;
(Continued)

(56) References Cited

U.S. PATENT DOCUMENTS 6,067,621 A * 5/2000 Yu ................. H04L 63/0838
  713/168
10,552,823 B1* 2/2020 Woodward ........... G06Q 20/322
(Continued)

FOREIGN PATENT DOCUMENTS

EP    1295264 A1    3/2003
FR    3067499 A1    12/2018
(Continued)

OTHER PUBLICATIONS

Y. Shah, V. Choyi, A. U. Schmidt and L. Subramanian, "Multi-factor Authentication as a Service," 2015 3rd IEEE International Conference on Mobile Cloud Computing, Services, and Engineering, San Francisco, CA, USA, 2015, pp. 144-150, doi: 10.1109/MobileCloud.2015.35. (Year: 2015).*
(Continued)

*Primary Examiner* — Michael Simitoski
(74) *Attorney, Agent, or Firm* — Knobbe, Martens, Olson & Bear, LLP

(57) ABSTRACT

A method for securing operations is described. In this method a user requests that a service provider device perform an operation, the service provider device transmitting to a certification device a request to validate the requested operation while indicating a key associated with the user. The certification device identifies the user associated with the key and transmits a dynamic code request to the user. A device that generates dynamic codes assigned to the user generates a first version of the dynamic code and transmits it to the certification device, which compares it with a second version of the code in order to decide whether it would or would not be appropriate to inform the service provider device that the requested operation has been validated.

14 Claims, 4 Drawing Sheets

(58) Field of Classification Search
CPC ............. H04L 63/0846; H04L 63/0861; H04L 63/1433; H04M 17/208; H04M 2017/248
See application file for complete search history.

(56) References Cited

U.S. PATENT DOCUMENTS

| | | | | |
|---|---|---|---|---|
| 10,915,891 | B1* | 2/2021 | Winklevoss | H04L 9/3255 |
| 2003/0168509 | A1* | 9/2003 | Nielsen | G06Q 20/20 |
| | | | | 235/379 |
| 2006/0020559 | A1* | 1/2006 | Steinmetz | G07C 9/21 |
| | | | | 705/67 |
| 2007/0203836 | A1* | 8/2007 | Dodin | G06Q 20/223 |
| | | | | 705/44 |
| 2008/0103984 | A1* | 5/2008 | Choe | H04L 9/3228 |
| | | | | 705/16 |
| 2009/0292641 | A1* | 11/2009 | Weiss | G06F 21/6245 |
| | | | | 705/72 |
| 2009/0307142 | A1* | 12/2009 | Mardikar | G06Q 20/3821 |
| | | | | 705/72 |
| 2011/0184867 | A1* | 7/2011 | Varadarajan | G06Q 20/4018 |
| | | | | 235/382 |
| 2011/0219230 | A1* | 9/2011 | Oberheide | H04L 9/32 |
| | | | | 713/168 |
| 2013/0226799 | A1* | 8/2013 | Raj | G06Q 20/401 |
| | | | | 705/44 |
| 2013/0273882 | A1* | 10/2013 | Walsh | G06Q 20/102 |
| | | | | 455/407 |
| 2014/0229339 | A1* | 8/2014 | Massiere | G06Q 20/40 |
| | | | | 705/26.81 |
| 2014/0245396 | A1* | 8/2014 | Oberheide | G06F 21/40 |
| | | | | 726/4 |
| 2014/0281506 | A1* | 9/2014 | Redberg | H04L 63/0442 |
| | | | | 713/159 |
| 2014/0337175 | A1* | 11/2014 | Katzin | G06Q 20/326 |
| | | | | 705/26.62 |
| 2014/0379575 | A1* | 12/2014 | Rogan | G06Q 20/3278 |
| | | | | 705/44 |
| 2015/0249540 | A1* | 9/2015 | Khalil | H04L 63/18 |
| | | | | 713/158 |
| 2015/0348044 | A1* | 12/2015 | Smith | G06Q 20/40145 |
| | | | | 705/72 |
| 2016/0300237 | A1* | 10/2016 | Khan | G06Q 20/3223 |
| 2017/0034141 | A1* | 2/2017 | Oberheide | H04L 9/30 |
| 2017/0085558 | A1* | 3/2017 | Ibrahim | H04L 63/0838 |
| 2017/0279795 | A1* | 9/2017 | Redberg | H04L 63/0861 |
| 2017/0323354 | A1* | 11/2017 | Martell | H04M 15/866 |
| 2017/0331801 | A1* | 11/2017 | Mezei | H04L 63/068 |
| 2018/0219851 | A1* | 8/2018 | Woo | H04L 63/083 |
| 2019/0034914 | A1* | 1/2019 | Kumawat | G06Q 20/385 |
| 2019/0213585 | A1* | 7/2019 | Patni | H04L 63/0838 |
| 2020/0084204 | A1* | 3/2020 | Craswell | H04L 63/0838 |
| 2020/0202354 | A1* | 6/2020 | Senn | G06Q 20/29 |
| 2022/0129903 | A1* | 4/2022 | Sambhar | G06Q 20/40145 |

FOREIGN PATENT DOCUMENTS

| | | | | |
|---|---|---|---|---|
| WO | WO-2009032523 A1 * | 3/2009 | | G06Q 20/10 |
| WO | WO-2012160318 A1 * | 11/2012 | | G06Q 20/12 |
| WO | WO 2017/196468 A1 | 11/2017 | | |

OTHER PUBLICATIONS

International Search Report and Written Opinion dated Apr. 8, 2020 for Application No. PCT/FR2019/052926.

* cited by examiner

METHOD AND SYSTEM FOR SECURING OPERATIONS AND ASSOCIATED USER STATION

RELATED APPLICATIONS

This application is the U.S. National Phase of Application No. PCT/FR2019/052926 entitled "METHOD AND SYSTEM FOR SECURING OPERATIONS AND ASSOCIATED USER STATION" and filed Dec. 4, 2019, which claims the benefit of French Patent Application No. 1874079, filed Dec. 21, 2018, each of which is incorporated by reference in its entirety.

TECHNICAL FIELD

The invention relates to the general field of securing operations (e.g. creating an account for any service or an access to this account or more particularly an online access to an account, an online payment, a physical payment, etc.) by computerized means.

PRIOR ART

Securing these operations is an important issue today given the proliferation of hackers who seek to steal users' identification and financial data. Several solutions have been developed in recent years, in relation to operations of different types, but these solutions nevertheless have a certain number of limitations.

With regard to direct payment transactions, i.e. non-online transactions (at merchants or for cash withdrawals): these transactions are distinguished in their basic versions by the introduction of a bank card into a terminal or a payment terminal which reads the data of said card, the security of the whole being ensured by the input of a complementary secret code known to the user alone. The main security problem at this level relates to the theft of the secret code (by means of dummy terminals, for example).

An interesting and rapidly growing approach relates to contactless payments of NFC (Near Field Communication) type, for which it suffices to hold the bank card near a payment terminal to validate a transaction. The advantage is the simplicity for the user (a single gesture is enough), coupled with a certain level of security, since the user does not enter his number or his secret code, and therefore does not reveal them. On the other hand, in a case where the card is stolen, the thief no longer needs a secret code. In order to limit the effects of card theft, the maximum price level per transaction and the cumulative price level per period is set at a low threshold.

Contactless smartphone payment solutions are aimed at the same use with a similar technology associated with a security measure, generally the previously-scanned fingerprint of the client or a scan of his face or iris. However, the latter data can be hacked. Indeed, the practice here is to replace the bank card with a smartphone for the convenience of the user rather than to render the process secure.

With regard to online transactions related to bank cards, these transactions are characterized, in their basic versions, by the fact of providing the card number, the latter being secured by the input of a complementary 3-digit code called CVV code (the names vary by bank). Security remains low as hackers only need to retrieve the number and the CVV code, or steal the card.

There are dynamic cryptogram cards, such as those incorporating the technology of the company Idemia whose 3-digit confirmation code, called CVV code, changes regularly (for example every hour). The advantage is then to drastically reduce the benefit of online hacking, for example via a keylogger tool, or due to phishing, during a transaction on a merchant site for example, of the bank card number (related to the account number of the client) and of this CVV code since potential hackers can only use it for a very short period of time. This method is a real progress in online transactions, even if it does not cover the cases of theft of the bank card itself. It is also unsuited to problems associated with reimbursement by the e-merchant.

The so-called "secure code" method used by banks allows them to request an online transaction validation from their clients after they have entered their bank data on a site: for this purpose, the banks send a validation code to their mobile phone (related to the bank account in the banks' internal databases) and instruct them to copy this code into a dedicated interface displayed on the transaction interface before returning to the merchant site.

This method is effective but more expensive than the previous one, and does not protect against the scenario in which the mobile phone and the bank card are stolen, as they are often carried together. It also does not prevent the theft of the bank card data (number and CVV code), and, due to its cost, the implementation of the secure code is not systematic. Finally, seasoned hackers manage to hack the content of the received SMS message, when the mobile phone is used both to order online and to receive the SMS with the secure code, which practice is tending to become predominant. The published French patent application FR3044789 allows the latter problem to be avoided, but its implementation is more complex and should be reserved for transactions of high amount or for secured processes.

There is also the case of bank details stored at an online merchant. The objective here is to simplify the client experience when ordering online. Upon validation of a basket, the client then only has to select their means of payment and to confirm the transaction by entering their CVV code. In terms of security, the hacker therefore only needs to retrieve this CVV code or the bank card/the mobile phone. This approach also opens the door to hacking of the servers of the e-merchant, followed by hacking of the CVV codes of the clients.

Therefore, in all the aforementioned cases, there are still security problems.

Another weak link is indeed even less well protected and relates to the creation by a user of an account on any service (a merchant service for example, or a classified advertisement service . . . ), and to the login of this user to this account by simple identifier and password, which data can easily be hacked by a hacker.

A slightly more secure approach consists in entering the password code using a dynamic table: display of an image on which the permitted digits or letters are in boxes, the client having the responsibility to click on the right boxes, the service retrieving the position of the clicks and deducing their correspondence. Here, hacking is a bit more difficult but not problematic for an expert in the field.

Another variant is the possibility for the service provider (e.g. the bank) to communicate a confirmation code by another means (e.g. another email), or alternatively by a technology close to the secure code (sending of a confirmation SMS message with the code on the mobile phone of the client). This last case of protection does not cover the cases of theft of the mobile phone (or alternatively the hacking of the email via the identifier and password, so as to access their email). Also, according to this scenario, it is assumed that the hacker already has the identifier/password of the client, and a wrong answer will only block the client's account, which will generate other problems.

These flaws are all the more unfortunate as theft of identity data on online services is rising.

DISCLOSURE OF THE INVENTION

The invention overcomes in particular the aforementioned drawbacks by proposing a method for securing operations, the method being implemented at a user station, and an overall method for securing operations implemented in a system including the user station as well a service provider apparatus and a certification apparatus. The method implemented at the user station can also be called "method for processing an operation".

The invention therefore provides a method for securing operations, comprising:
- a step of formulating a request, from a user (U) associated with a key (CL) issued by a certification body, to implement an operation with a service provider apparatus;
- a step of receiving, by a user station, a request for a dynamic code, intended for the user associated with the key (CL), from an apparatus of the certification body;
- a step of generating, by a dynamic code generator device associated with the key of the user, a first version (CC1) of the dynamic code;
- a step of transmitting the first version (CC1) of the dynamic code to the certification apparatus; and
- a step of receiving, from the service provider apparatus, a message confirming the achievement of the requested operation, provided that the first version of the dynamic code corresponds to a second version of the dynamic code generated at the certification body.

Correspondingly, the invention also relates to a user station comprising:
- a user interface configured to allow a user (U) associated with a key (CL) issued by a certification body to formulate a request to implement an operation with a service provider apparatus;
- a first receiving module intended to receive a request for a dynamic code, intended for the user associated with the key (CL), from an apparatus of the certification body;
- a module for transmitting, to the certification apparatus, codes produced by a dynamic code generator device associated with the key (CL) of the user; and
- a second receiving module intended to receive, from the service provider apparatus, a message confirming the achievement of the requested operation.

The invention also provides an overall method for securing operations, the method for securing operations comprising:
- a step of requesting, by a user, to implement an operation with a service provider apparatus;
- a step of issuing, by the service provider apparatus to a certification apparatus, a request to validate the requested operation, said request indicating a key (CL) associated with the user;
- a step of issuing, from the certification apparatus, a request for a dynamic code, intended for the user associated with the key (CL);
- a step of generating, by a user dynamic code generator device, a first version (CC1) of the dynamic code;
- a step of transmitting the first version (CC1) of the dynamic code to the certification apparatus;
- a step of acquiring a second version (CC2) of the dynamic code and comparing the first and second versions of the dynamic code by the certification apparatus; and
- provided that the first and second versions (CC1, CC2) of the dynamic code match, a step of transmitting by the certification apparatus to the service provider apparatus a signal indicating the validation of the operation requested by the user.

Correspondingly, the invention also relates to a system for securing operations, this operation-securing system comprising a service provider apparatus and a certification apparatus, in which:
- the service provider apparatus comprises:
  - a module for receiving a request, from a user (U), to implement an operation,
  - a module for issuing to the certification apparatus a request to validate the requested operation, said request indicating a key (CL) associated with the user, and
  - a module for implementing the requested operation following receipt of a validation signal from the certification apparatus; and
- the certification apparatus comprises:
  - a module for issuing a dynamic code request, intended for a dynamic code generator device assigned to the user associated with said key (CL),
  - a module for receiving a first version (CC1) of the dynamic code generated by the dynamic code generator device assigned to the user associated with said key (CL),
  - a module for acquiring a second version (CC2) of the dynamic code,
  - a module for comparing the first and second versions (CC1, CC2) of the dynamic code, and
  - a module for transmitting a validation signal to the service provider apparatus (20) when the first and second versions (CC1, CC2) of the dynamic code match.

The methods, the user station and the system according to the invention allow several drawbacks of the state of the art to be avoided, particularly those related to the logging-in of a user to an online account. Moreover, these methods, this station and this system allow implementation of a double authentication for on-line payments thus ensuring a high level of security in accordance with the European directive DSP2.

In some embodiments of the invention, the user station has its own integrated dynamic code generator device. However, other solutions can be used, e.g. using an external dynamic code generator device.

In some embodiments of the invention, the certification apparatus includes its own dynamic code generator device configured to generate the same codes as the device assigned to the user, at the same times. However, other solutions can be used, e.g. obtaining the second version of the code from an external device.

In a particular embodiment, the service provider apparatus obtains an identifier from the user and, using said identifier, acquires the key (CL) associated with the user, in particular from one of its storage means or from a reliable external source. Securing the operation desired by the user becomes even less expensive for the latter, who no longer needs to enter a password associated with his identifier. Moreover, the user can use the same identifier on his accounts with several service providers who implement this embodiment, without loss of security, since it is the key CL associated with his account, and not the identifier, that secures the connection.

In another embodiment, the step of issuing the request to validate the operation comprises issuing a request including information about the requested operation; and the method comprises a step of retrieving data of the user associated with the key (CL), the latter step comprising:

retrieving verification data that indicate at least one restriction in relation to the permitted operations, and analyzing the received information on the requested operation in order to determine whether this operation is permitted or not in relation to the verification data.

This step of retrieving verification data may comprise retrieving data defining at least one restriction as to the operations permitted in relation to the key CL. These data are for example: a time period during which operations are permitted, a geographical area where, or from which, operations are permitted, a service provider with which operations are permitted, and a price associated with the achievement of the operation. According to one particular embodiment, the restrictions defined by the verification data can be parameterized by the user, for example depending on the use he intends to make of his key CL.

The verification data makes it possible to define terminals for the use of the key assigned to the user, these terminals being set by the certification body, by the user or both. The security of the operations will be all the more enhanced as, among other things, a hacker will not know the restrictions that apply to the use of the key CL and will not be able to adopt the behavior necessary to satisfy the restrictions.

In addition, the use of the verification data offers wide possibilities of parameterization of the method/system and makes it possible to define new specific secure applications. One big advantage of these parameters is their combinations. As a non-exhaustive example, besides their advantage in securing accounts, these combinations allow, without creating a new account and without requiring a new payment card, the transmission of a payment key CL to a child as pocket money restricting him to certain stores, to a list of online merchant sites and/or to a specific amount per month. These combinations also make it possible to give a key CL card with a specific amount to a child going to do an internship abroad, the key being valid in said country for the period of the internship.

The use of the verification data makes it possible to carry out an anti-spam method, the overall security method being adapted as follows:

the request is formulated not by the user but by the service provider apparatus and comprises a request to transmit a message to the user associated with the key (CL);

the step of retrieving the data of the user associated with the key (CL), by the certification apparatus, comprises retrieving verification data indicating anti-spam parameters of the user and retrieving the details of the user;

the steps of issuing a request for a dynamic code, and generating the first and second versions of the dynamic code are omitted; and the step of transmitting the signal indicating the validation of the requested operation consists in transmitting the message to the user according to the details retrieved by the certification apparatus when the certification apparatus finds that the transmission of the message is compatible with the anti-spam parameters of the user.

According to this anti-spam method, the service provider SQ does not have the contact details of the user, and the certification apparatus allows transmission to the user of the service provider's message only when the message complies with the anti-spam parameters defined in relation to this user. Thus, for example, the user can specify the number of messages per time slot that he agrees to receive from a specific service provider and/or the communication means (e.g. SMS, email) by which he agrees to receive the messages.

According to one embodiment, the restrictions are parameterizable by the user. For example, a user interface allows him to modify the parameters associated with a given key CL during a preliminary step of the method or at any time, for example by logging in to his account with the certification body and by selecting the wanted key CL. The user can thus modify a period of validity, authorizations of use, authorized amounts . . . . The modification will have no effect on past uses, but will be applicable for future uses of the key CL. In this way, the user obtains an increased level of control over the sensitive operations he performs.

In another embodiment, the generation of the first version of the dynamic code by the dynamic code generator device associated with the user's key CL is triggered by an action of the user. In this way, the predictability of the dynamic code which will be transmitted to the certification apparatus will be further reduced, further reducing the likelihood of hacking of the data, since there is—in addition to the variability associated with the dynamic generation of the codes-a random variability at the initiative of the user.

The triggering, by an action of the user, of the production of a new code by the dynamic code generator device assigned to the user implies a need to synchronize the dynamic code generator device on the certification apparatus side with the dynamic code generator device on the user side. Various approaches are suitable for achieving this synchronization such as, for example, the use of ordered sequences of codes. In a particular embodiment, the certification apparatus is configured to attempt to address gaps in positioning within the code sequence when it finds that the first and second versions of the code do not match. To this end, the certification apparatus can implement an iterative process which consists in acquiring a new version of the dynamic code, in comparing the new version with the first version (CC1) of the dynamic code, and in the case of a positive comparison determining that there is matching of the codes but, in case of a negative comparison, repeating the steps of the iterative process until a number n of versions of the code has been acquired and compared with the first version of the code. This process can be employed in one embodiment according to which the dynamic code includes a sub-code (CCs) serving for these synchronization purposes and the evolution of the dynamic code includes the progressive change of each character of the synchronization sub-code according to a respective rule. Moreover, according to some particular embodiments, the characters of the synchronization sub-code are distributed among the other characters of the dynamic code.

The measures mentioned above ensure good synchronization between the dynamic code generator devices on both (user and certification body) sides while obtaining a high level of security.

According to one particular embodiment, the user station is provided with an actuation module, intended to be actuated by the user to trigger the generation of a code by the dynamic code generator device, and with a biometric-data sensor. In this user station, it is possible for the biometric-data sensor to obtain biometric data of the user when the actuation module is actuated by the user. If the biometric-data sensor does not validate the biometric data detected during said action of the user, the code transmission module does not transmit a valid code to the certification apparatus (e.g. no signal is transmitted to the certification apparatus or a signal is transmitted indicating that incorrect biometric data have been detected).

According to another aspect, the invention also relates to a user station comprising a dynamic code generator device, a module for transmitting to a certification apparatus codes produced by the dynamic code generator device, and a biometric-data sensor.

By making the transmission of the first version of the code conditional upon the validity of the user's biometric data a second level of authentication is introduced into the method, thereby further increasing security.

In a particular embodiment, the step of the certification apparatus issuing the request for a dynamic code comprises transmitting to a user station information about the requested operation. This allows the user to be warned that a third-party is attempting to perform an operation by using the key CL of the user. The user can therefore use his station to transmit to the certification apparatus a signal indicating the rejection of the operation and the certification apparatus will therefore not issue a validation signal to the service provider apparatus (for example a non-validated operation signal will be transmitted).

In a particular embodiment, the step of the certification apparatus issuing the request for a dynamic code comprises transmitting to a user station a request for complementary information, and the validation of the operation by the certification apparatus is conditional upon the complementary information returned by the user station. As a non-limiting example, the certification apparatus can request data concerning the geolocation of the user station, and the validation of the operation by the certification apparatus is then conditional upon the geolocation information returned by the user station. For example, the certification apparatus verifies whether this information conforms to the verification data associated with the key CL of the user. It is thus possible to add a layer of security to the basic method/system.

The method and the system for securing operations according to the invention allow several types of different sensitive operations to be made secure, for example: the creation or the secure login to an account, a financial transaction, a banking operation, a purchase on a physical or online site, cash withdrawal from an automatic teller machine (ATM), or even an innovative anti-spam service. The great advantage of the method and of the system is the increased security compared to the methods of the state of the art, accompanied by great ease of use.

The method provides strong security during the creation of an account, both for the service provider and the user, because the validation of the account is related to a process external to the service.

According to another example, the method provides strong security when logging in to an account: the service provider only needs the user identifier (no need for a password or, as a variant, for other personal information) and his key CL. This information is unusable for a possible hacker without the possession of the different devices generating dynamic codes for the clients in question, particularly if the service provider does not store the personal data which can be sent back to it at the end of the method.

In regard to the user experience, according to various embodiments of the invention the user simply enters his identifier, then copies his CC code.

The same goes for online financial transactions. The e-merchant no longer fears the risk of hacking, since he stores in regard to a client a key CL that is unrelated to a bank card number (and possibly only valid for this e-merchant for amounts predefined per period). Instead of entering a bank card number, then the expiry date and the CVV code, the user only enters the CC code generated by his dynamic code generator device. In addition, this device is compatible with methods of the state of the art.

In a particular embodiment, the different steps of the securing method are governed by computer program instructions. Consequently, the invention also relates to computer programs on respective information media, these programs being capable of being implemented in the service provider apparatus, in the certification apparatus and in a user station, or more generally in a computer. These programs include instructions adapted to the implementation of the steps of a computerized method for securing operations as described above.

These programs can use any programming language, and be in the form of source code, object code or intermediate code between source code and object code, such as in a partially compiled form or in any other desirable form.

The invention also relates to information media readable by a computer, and including instructions from the computer programs as mentioned above.

The information medium can be any entity or device capable of storing the program. For example, the medium may include a storage means, such as a ROM, for example a CD ROM or a microelectronic circuit ROM, or a magnetic recording means, for example a floppy disk or a hard disk.

On the other hand, the information medium can be a transmissible medium such as an electrical or optical signal, which can be conveyed via an electrical or optical cable, by radio or other means. In particular, the program according to the invention can be downloaded from an Internet type network.

Alternatively, the information medium can be an integrated circuit in which the program is incorporated, the circuit being adapted to execute or to be used in the execution of the method in question.

It is furthermore possible to envisage, in other embodiments, that the securing method, the securing system and the user station according to the invention have in combination all or part of the aforementioned characteristics.

DESCRIPTION OF THE EMBODIMENTS

Figure 1:
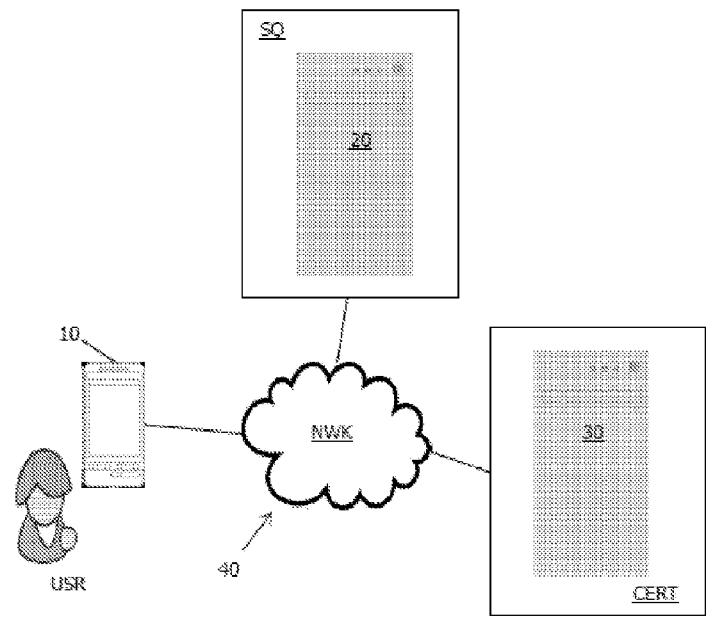
FIG. 1 schematically represents a securing system according to the invention in one particular embodiment.

FIG. 1 schematically represents a security system according to the invention in one particular embodiment. Note that the example represented in FIG. 1 relates to a system comprising a user station as well as a service provider apparatus and a certification apparatus. As an alternative, the system does not include a user station and the user U introduces the necessary data (e.g. an identifier, the first version of the dynamically generated code and, optionally, the key CL) by using means provided, for example, by the service provider.

In the example considered in FIG. 1, the system 1 for securing operations comprises a user station 10, a service provider apparatus 20 and a certification apparatus 30 which communicate with each other via a network 40 (e.g. Internet, telephone network, WAN, LAN, wired or wireless network, etc.).

The user station 10 can be a mobile phone, a tablet, a PC or any other device of a user U. Typically, the service provider apparatus 20 consists of a server or a group of servers operated by a service provider SQ, possibly associated with other equipment. The service provider SQ can be a merchant, a bank, etc. Typically, the certification apparatus 30 consists of a server or a group of servers operated by a certification body CERT, possibly associated with other equipment. The certification body CERT can be a bank, a mobile operator or any other type of body suitable to issue a key CL and propose to the service providers SQ a standardized approach in accordance with the one described below.

Figure 2:
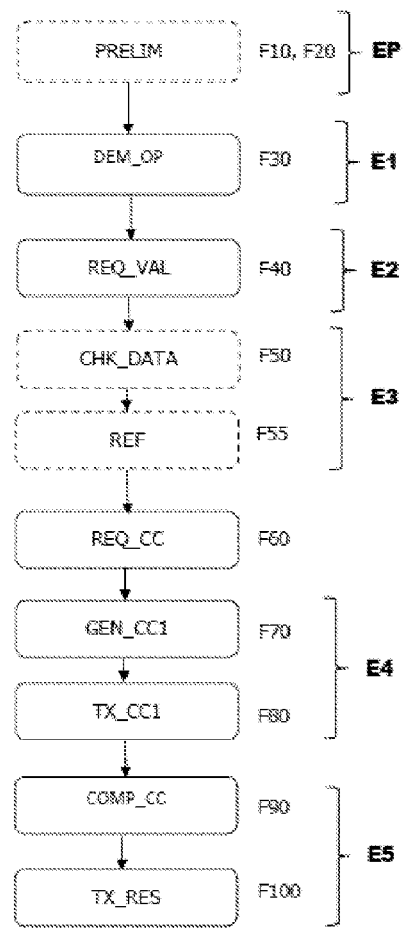
FIG. 2 represents, in the form of a flowchart, the main steps of an overall method for securing operations according to the invention.
Figure 3:
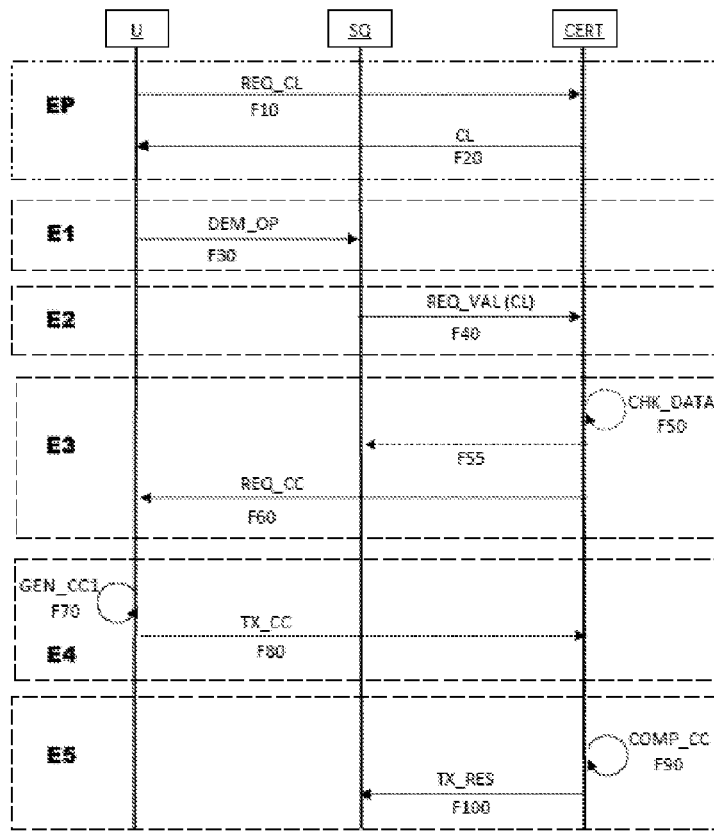
FIG. 3 schematically represents the main interactions between the elements of the system during the course of the method of FIG. 2.

The main steps implemented during the method for securing operations according to the invention in a particular embodiment will now be described with reference to FIGS. 2 and 3. This method can be implemented by the system represented in FIG. 1. FIG. 2 represents, in the form of a flowchart, the main steps of the method and FIG. 3 schematically represents the main interactions between the elements of the system during the course of the method.

According to certain particular embodiments, the method represented in FIG. 2 can include a preliminary phase or step (EP) during which a key CL is assigned to the user U. This preliminary step EP can comprise, notably, a first sub-step F10 according to which the user formulates with the certification body a request tending to produce (generate) a key CL and the assignment of this key CL to the user. The certification body CERT transmits the key CL to the user in a sub-step F20 and typically also transmits to the latter a dynamic code generator device DC. Alternatively, the user already has a dynamic code generator device and at this stage obtains from the certification body CERT only the generated key CL.

When the user U wishes to undertake a transaction or other operation, in particular a sensitive operation, by using his key CL, the user formulates a request DEM_OP to the service provider SQ (F30) during a first step E1 of the method.

Then, during a second step E2 of the method, the service provider apparatus 20 transmits to the certification apparatus 30 a request REQ_VAL (CL) to validate the requested operation, said request indicating the key CL associated with the user U (F40).

During the third step E3 of the method, the certification apparatus 30 identifies the user associated with the key CL, for example by performing a search in a database by means of the key CL. According to some embodiments of the invention, the certification apparatus 30 retrieves (F50) verification data, recorded during the preliminary phase EP, associated with the use of the key CL and performs certain verifications, for example in relation to information concerning the operation requested from the user U, this information having been transmitted to the certification apparatus 30 by the service provider apparatus 20 (e.g. in a message which includes the key CL). If appropriate, the certification apparatus 30 can already transmit to the service provider apparatus a message indicating that the requested operation is outside the permitted uses for the key CL (F55). Then, the certification apparatus 30 issues a dynamic code request REQ_CC, intended for the user associated with the key (CL) (F60). Of course, if the certification apparatus has already indicated to the service provider SQ that the requested operation is not valid, the method can end at step F55. In a system according to the example represented in FIG. 1, the certification apparatus 30 can transmit the request REQ_CC to the user station 10, on a form which will be displayed on the screen.

Following receipt of the request REQ_CC transmitted by the certification apparatus 30, and during the fourth step E4 of the method, the dynamic code generator device DC associated with the key CL of the user produces a first version CC1 of the dynamic code (F70). According to some embodiments of the invention, the dynamic code generator device DC is provided with a push button (or other means that can be actuated by the user) and the dynamic code is generated following the actuation of this push button by the user. There follows a step (F80) of transmitting to the certification apparatus 30 a message TX_CC1 comprising the first version CC1 of the dynamic code.

The method ends with a fifth step E5 during which the certification apparatus (30) acquires a second version (CC2) of the dynamic code and compares it with the first version of the code and, provided that the first and second versions (CC1, CC2) of the dynamic code match, transmits to the service provider apparatus 20 a signal TX_RES indicating the validation of the operation requested by the user U (F100). Of course, in the event of a negative result of the comparison, the certification apparatus 30 can transmit to the service provider SQ a message indicating that the requested operation has not been validated. Optionally, further information can be transmitted to the service provider apparatus at the end of step E5. Furthermore, the result of the comparison (F90) can obtain performance of other operations by the certification apparatus 30 (e.g. the update of the amount of a credit associated with the CL code).

Different ways of carrying out steps EP and E1 to E5 represented in FIGS. 2 and 3 will now be explained in more detail.

The Preliminary Step (EP)

During the preliminary step EP of the method, the body responsible for certifying the operations (e.g. the transactions or the connections) provides the user with a key CL associated with a device DC generating dynamic cryptogram codes CC (this device DC being either already held by the user or provided to the user by the certification body during step EP).

Means for Obtaining the Key CL Associated with the User

For this purpose, according to one preferred embodiment, said user must first register with said certification body CERT and provide it with various elements: last name, first name, contact details (telephone, email address), etc.

Registration can be done online (possibly using a method such as that of the invention) or physically, as with a traditional bank branch. It can also be mixed: for example a $1^{st}$ phase of online registration and a second phase after delivery of a physical device DC to his pre-indicated address (for example his postal address, in an agreed location such as a relay . . . ).

The (User) Data Associated with the Key CL

According to one embodiment, the user requests a key CL from his certification body and specifies various parameters, corresponding to different types of information that the certification body will associate to said key CL in one way or another, for example by means of a database, or any other means for managing the persistence of these data, dedicated to said certification body. The list of types of information can be very variable, and only one non-exhaustive subset is mentioned here. Some of the information will serve as verification data but others correspond to metadata associated with the user (of course some information can fulfill both roles).

For example, the types of information can relate to:

The Users of the Key CL:

If no name is specified, a link can be made with the name of the user U-Init as indicated during his registration (as indicated during the description at the start of the previous step).

The user can specify another third-party name, or an alias (name he wishes to relate to this key CL).

The user can optionally specify several names, if the key is intended to be shared (a bit like a joint account).

For these different cases, by taking the example of associating using a database, the certification body will manage the association of the key CL with its owner U-Init and the different complementary identity/identities U-Comp above.

It is possible to add complementary data to each identity U-comp (optional), depending, for example, on the legislation(s) in force in the country concerned:

The age of U-Comp (if the key is, for example, assigned to a child of U-Init who is a minor) or alternatively the corresponding (minor or adult . . . ) status. By default, this parameter is initialized to that of U-Init.

If it is a legal or natural person (plus any specifications: company name . . . ).

The associated communication identity/identities, possibly distinct from those of U-Init (for example telephone number, messaging identifier, email . . . ), and alternatively the associated means (sending by SMS for example).

Authorizations to Disclose to SQ Information Related to the Key CL:

As non-exhaustive examples, the authorization or non-authorization to disclose the last name, first name, age, address, a communication means . . . can be cited. A default authorization can be provided on all or part of these data in the absence of them being specified. As a non-exhaustive example, said release of the data that the user agrees to disclose may be effective in step E5 of the method and device.

Authorizations of Use (by SQ) Related to the Key CL

Authorizations always given to SQ. As a non-exhaustive example, these authorizations of use are employed in the case of an anti-spam application, described at the end of the present document.

Secure Operations/Use Cases of the Key CL

Optionally, at least one specific use case of the key CL can be specified. There are many examples of use cases.

By way of non-exhaustive example, the use cases are:
a registration and/or a connection to a website or an application,
a subscription to any service (newspapers or print magazines . . . ),
a generic physical or online payment,
a payment in at least one specific store (a given store of a given supermarket chain for example).
an online payment on at least one merchant site.

Depending on the requests of the user, a key CL can thus be restricted to registration and connection or online payment formalities, or both, possibly on a specific site . . .

A key can therefore have several use cases (not to be confused with the authorizations of use): for example registration, connection to a site and online payment on said site.

In the absence of any use-case restriction, the key CL can serve for all possible use cases for the user in question. Indeed, these use-case restrictions are optional. The user can use a single key to connect/register on different sites or services without specifying which ones, or pay on said sites if they are merchant sites. But he will not then be able to benefit from the advantages mentioned above nor those that will be specified below.

Other Restrictions when Using the Key CL

Optionally, at least one restriction can be defined in relation to a use of the key CL. Examples of restrictions are numerous, and only a few are listed below:

restrictions in terms of duration, or period of validity of the key CL

Optionally, there may be several validity periods associated with said key.

restrictions in terms of geographical location

These restrictions can be made, for example to limit the uses of a key CL to a given geographical area, as non-exhaustive examples: in a country, or at the geographical location of a specific store.

restrictions in terms of amount (in relation to payment-type uses)

For example, a maximum amount, and possibly an amount per time period (possibly with separate amounts depending on the periods) can be specified.

Also at this level, it is possible to specify whether the payments are made only on a fee-for-service basis or whether subscriptions are permitted (the above-described restrictions in terms of duration and periods can limit their scope).

Means for Setting the Parameterization of the Verification Information Associated with the Key CL Conventional means can be used to allow the user to specify his wishes when parameterizing the verification information. Specifying all the known means does not fall within the scope of this patent application but, as a non-exhaustive example, during a request for a key CL, regardless of the means implemented for said request (physical in a branch, by telephone, online via forms from the certification body), the user can specify the data relating to said target, possibly using lists of references available from the certification body.

As other non-exhaustive examples:
In the case of a key intended for an online payment, the user can specify the online payment option.
In the case of a key intended for a payment for one person, the user can specify the generic payment option.

According to another example, during an online request, the user can specify "registration for a service", then select from a list of known services, or manually add the name (and possibly the URL corresponding to the domain name in the case of a website) of said service or site if it is not in the list of known sites.

Alternatively, said service corresponding to SQ itself provides, prior to the preliminary step, the name or code name by which it is referenced by the certification bodies, in the case where a reference list of these services exists.

The parameters can also be presented in dependence on each other.

Thus, without prior limitation, the user can formulate a restriction request in terms of payment amount in order to be able to specify said amounts and associated terms. This option is proposed to the client automatically only if, for his key CL, a payment use has been indicated.

The combination of these different types of parameterization data related to the key CL may require verifications in subsequent steps: for example, a key CL allowing physical payment only in a given store may require all or part of the following verifications during the subsequent steps: non-online payment process, transmission of data from the seller to verify their concordance with those relating to the key, possible geolocation of the seller to be checked in relation to that relating to the key .... One advantage of the method and system according to this embodiment of the invention, apart from its extreme parameterability, is that at no time does the seller or the hacker know the verification data associated with said key.

Moreover, as mentioned above, one important advantage of these parameters derives from the combinations that can be made.

The Timing of the Parameterizing of the User Information Associated with CL

Note that, according to some embodiments of the invention, the user can modify the parameters associated with a given key CL not only during the preliminary step EP but also at any time. The user can perform the desired modification by logging in to his account with the certification body, then selecting the desired key CL, then by modifying said parameters.

The Key CL

According to a particular embodiment of the invention, the key CL is the number of a bank card, possibly coupled with an expiry date, and the CC code is said dynamic cryptogram code. The entity acting as a certification body is then a banking body.

However, despite all its advantages (mature technology, existing players, automatic identification of the certification body (here the bank) via the card number ... ), this implementation has some drawbacks: the APIs (Application Programming Interfaces) between the merchant sites and their bank are already in place and are distinct according to the banking institutions (which then exchange the transaction data in a standardized manner), no adaptation for the validation of third-party data to market data, feedback of information different from the information envisaged by the method and device described here.

According to one embodiment, the key CL provided by the certification body does not necessarily correspond to the number of a bank card, but is a unique key intended for said user. This key is composed of a predefined number of successive characters (e.g. digits and/or letters). Alternatively, this succession of symbols can also incorporate special characters.

This unique key can be provided electronically to the user, or in any other form. It can thus possibly be materialized on a plastic card as is the case for bank cards.

According to particularly one embodiment, like bank cards, the key CL incorporates in the code of this key a means allowing the identification of the certification body, which allows standardization of this succession of characters, and allows standardized APIs independent of the certification bodies. Another advantage of this variant is of course that said keys CL are globally unique: no possible duplication on the market.

For example, if said key was composed of 16 characters, the 12 first characters can be dedicated to the specific key of the user and the 4 last characters to the identification of the issuing body. In this case, said list of the certification bodies and their codes is unique regardless of the key CL.

The case of the banking institutions proposing keys CL that can be viewed on a bank card and possibly incorporating a dynamic cryptogram device being known, the following explanations are positioned in relation to these cases to better explain the advantages of the solution.

According to a $1^{st}$ variant, the key CL corresponds to a bank card number, possibly combined with an expiry date, and the device DC of dynamic cryptogram codes CC corresponds to the one available on the dynamic cryptogram cards, with the 3-digit code (called CVV code) changing periodically, according to a method and with means already explained above. However, the drawbacks of this $1^{st}$ variant have already been mentioned, particularly relative to the rigidity of the procedures already in place and to their low scalability.

According to another variant, the key CL is not a card number and may include a succession of letters and/or digits, with certain standardized sequences and positions particularly in order to recognize the certification body as already indicated. The key is for example communicated to the user, electronically or by any other means by the certification body. Alternatively, it is affixed and visible on any medium, such as a plastic card for example.

As disclosed below, according to one embodiment, code elements of the key CL can make it possible to determine with certainty the certification body issuing said key CL.

According to one of the embodiments, the code elements of the key CL (as a non-exhaustive example the $11^{th}$ and/or the $12^{th}$ character of the key) allow particular restrictions on the use of said key, when there are any, to be specified: as a non-exhaustive example, a key that has no restriction would have A in the $11^{th}$ character while a key that can only be used for a registration request would have I in the $11^{th}$ character.

A device DC can be associated with several keys CL

The user can indicate valid data for a default use, then request the creation, by the certification body, of different keys with distinct data (particularly if he intends one of said keys to be for a third-party, such as a child for example) or partially distinct data.

Having a single device DC for all these keys or for some of them greatly simplifies the task of the user (no need to have 5 cards (or rings, watches, etc.) each with one of these devices DC). Alternatively, he may have a limited number of devices DC: for example, a first one intended for his accounts with different services and another one intended for his payment means.

According to another embodiment, several devices DC of the user are combined on the same medium. As a non-exhaustive example, a medium such as a ring having screens has 2 devices DC and a respective display screen, a $1^{st}$ screen intended for the display of the keys CC of the $1^{st}$ device corresponding for example to keys for accessing various services, a second screen intended for the display of the keys CC of the $2^{nd}$ device corresponding for example to keys for accessing online payments.

According to another possible implementation, said medium has only one display screen and a means such as a push button as a non-exhaustive example allows switching from one type of display to another, this means being distinct from a possibly present pulse means that the user uses to generate the next value of the dynamic code. In which case, a visual clue, e.g. a symbol or a color on the display allows each of the 2 devices DC to be differentiated.

According to a $1^{st}$ variant, said common device DC has a means for displaying the different keys it supports, so that the user selects the desired key to obtain the corresponding current (or pulsed) CC code. This variant, however, makes the device DC more complex and furthermore makes its use complex: If, for example, a key CL comprises a series of 16 digits and/or letters, the user must remember to what use each of these quite laborious sequences corresponds.

In one preferred embodiment, the device DC generates a CC code according to one of the implementations detailed above, independently of the choice of a key. The link between this device DC and one or several key(s) CL of the user is then saved only at the databases of the certification body. This latter variant, in addition to eliminating the drawbacks mentioned above, has another advantage for the user namely that he is able at any time to add or delete new keys CL related to this device DC, without having to modify said device (it is sufficient to add or remove said link between CL and DC in the databases of the certification body).

For example, by this means, a user can have a ring provided with such a pulse device DC, generating on demand a cryptogram code CC, and use said code in the following steps of the method and device to:
  a) Secure a registration or a connection (login) on a site A to which corresponds a $1^{st}$ key CL
  b) Secure a registration or a connection on a site A or B to which corresponds a $2^{nd}$ key CL for which it releases other identity data (an alias for example)
  c) Make an online payment by indicating a $3^{rd}$ key CL (and allowing the site in question to save it for the next exchanges),
  d) Make an online payment with the number of his bank card which then serves as $4^{th}$ key CL, the CVV code no longer needing to be written on the back of said card (since in our example it is shifted onto the user's ring (according to another exemplary implementation, the device DC is incorporated into the bank card and is used for all the examples of use cases).
  e) Secure his connection to the site of the bank that issued said card, which corresponds to a $5^{th}$ key CL The First Step: E1

During the first step E1, the user makes a request to perform an operation with an apparatus of any SQ service. The operations targeted are very varied. Here are some examples given without limitation: a request to create an account, a request to initiate a transaction, a request to access premises or a physical or digital resource (e.g. request to open or start a car, request to enter a private house or company), etc. On this occasion, he indicates or associates his key CL and the certification body. According to the variant according to which the key CL includes the code of the certification body, the user does not need to provide this information during this step E1.

The type of operation (account creation, account login, start of a payment transaction . . . ) can be implicitly determined during this step E1.

If for example the user clicks on or presses a button of the type "Create your account", the apparatus of the SQ service will determine that this is an account creation, and this information will be used in the remainder of the method.

According to one embodiment, a standardized API is made available to the apparatus of the SQ service by the certification body and allows it to select a type of operation, then to provide the complementary information required as a function of this type of operation. According to this variant, this same API will be used for the different data exchanges between the SQ apparatus and the certification body during the subsequent steps of the method.

$1^{st}$ Example: The User Selects an Operation of the Type "Account Creation" with the Apparatus of the SQ Service.

The sole useful information to be provided by the user is the key CL. Depending on the configuration carried out in the previous step, the key CL is either intended only for usage on the SQ service, or for more general uses which include use on the SQ service.

But as will be seen later during the description of other types of operations, being limited to this single information can be problematic for the user given that it requires him to retain the composition of said key associated with its use on the SQ service.

Thereby, in addition to the key CL, the apparatus of the SQ service can propose to the user to fill in a form including complementary information, such as a connection (login) identifier for example. As a non-exhaustive example, said identifier is a personal telephone number or a personal email. According to another variant, the registration form includes other information such as, as a non-exhaustive example, the last name, the first name and for example the address or another contact data of said user.

However, according to one embodiment, if the user has authorized it this complementary information is provided during subsequent steps by the certification body and not by the user.

$2^{nd}$ Example: The User Selects an Operation of the Type "Account Login" with the SQ Service.

It should be noted that the implementation of this $2^{nd}$ example implies that the user has previously selected an operation of the type "Account creation" with the SQ service, then positively followed up with all the steps of the method according to one embodiment of the invention relative to this creation of an account with the SQ service using an appropriate key CL. Clearly, he already has an account with SQ, an account which was created using the described method and device.

Alternatively, if the user has registered for said SQ service via a conventional registration process, to subsequently connect to this same service by means of the described method and device, he must have previously completed his profile with said SQ service by adding his key CL. Following this update, the user will subsequently be able to connect using a method and system implementing the invention. In which case, to login to said account with SQ, the user must indicate the key CL related to this account.

As seen above, such an implementation requires that the user remembers the composition of the key CL, which, if it consists as a non-exhaustive example of 16 letters or digits, is not at all straightforward. According to one embodiment, the user enters the personal login ID that he indicated when creating his account during a previous operation. Thanks to the implementation of the method and device, he does not have to enter a password at this step. The apparatus of the SQ service then retrieves the key CL associated with the account of the user in one of its storage means, such as a database of said SQ service, key CL that said user has indicated in relation to this login ID when creating his account or during an operation of subsequently updating his account on said service. The storage means can be internal or external to the apparatus 20 of the SQ service.

$3^{rd}$ Example, the User Selects an Operation of the Type "Online Payment" after Having Selected an Item or Composed a Basket with the SQ Service.

Two scenarios are to be distinguished:
a) The key CL that the user has indicated for said SQ service is used both for registration and/or connection (login) and also for online payment. In this case, once connected to the SQ service device as described above, the user has nothing to indicate. In this step, all he has to do is validate the amount of his basket or the amount of the transaction and wait for the interactions resulting from the subsequent steps of the method.
b) The user uses another key CL as a means of payment, whether this key CL is generic for all his payments or restricted (during the initial step) to use on the SQ service.

In the $1^{st}$ case, it may be, as a non-exhaustive example, the number indicated on the back of a bank card compatible with our method and device. In the cases other than bank cards, it can be any key CL. In this case, the user simply has to indicate the number or said sequence of his payment key CL, and wait for the interactions resulting from the subsequent steps.

Unlike the methods and devices of the state of the art, the user can without any fear, particularly in the cases other than bank card numbers, keep his payment key at said SQ service since, as will be seen subsequently, said key will be unusable by any hackers without having the associated device DC.

Not to mention the drastically enhanced security, this also results in an unparalleled client experience on the payment side: instead of the validation of an amount followed by the input of his bank details, the user only has, in this step, to validate his payment amount.

Of course, if the merchant site is limited to classic payment APIs, the solution provided here is compatible since the same card number can be used according to the ways of the state of the prior art to access merchant services not affiliated to our method (the user will only have to enter his bank details in a conventional way directly at this step: bank card number, expiry date and CVV code generated by the device DC), and to access SQ services affiliated to our method.

The Second Step: E2

During step E2 of the method, the apparatus 20 of the service provider SQ requests the certification body to validate the operation carried out in step E1. This step here consists in communicating to said certification body the key CL selected by the user in step E1, and concomitantly the contextual data corresponding to said operation.

According to one embodiment, said transmission of information is standardized and is performed through an interface (API) provided by a third-party body OT to which said SQ service is affiliated for this API (this third-party body can also be a certification body, but the key CL is not necessarily managed by the latter, but by any certification body on the market), being an interface detailing the procedures for interactions with the different certification services on the market as well as the format of the exchanged data.

According to this variant, in addition to the key CL associated with the user, the apparatus of the SQ service provides in a standardized manner different information in relation to the type of operation requested by the user in step E1.

For example, the apparatus of the SQ service provides the certification body with the key CL of the user and a codification corresponding to the performed operation. It can also provide a KSQ key, specific to the apparatus of the SQ service.

The codification is for example a sequence of 3 letters.

This codification is for example "CRE" for an account creation, "CNX" for an account login, "PAY" for a one-shot payment, "PAYn" for a payment in installments (with as associated data the number of times . . . ), "PAYAb" for a payment by subscription with as associated data the duration of the subscription, the periodic amount . . . , Many other uses are possible (for example a transfer to a third-party account or to another key). Each use is associated with a specific code and with one or more items of complementary information related to the type of operation (for example for a transfer, in addition to the keyword of "VIR" type, an amount, an account or a third-party key and a deadline indication).

It should be noted that the processing of the API program implemented at the apparatus of the SQ service also allows a $1^{st}$ series of checks to be carried out at the SQ service, such as for example verifying the conformity of the key CL (number of characters, determination of the certification body (as a function of the corresponding code included in the key . . . ) and according to the variant detailed at the end of the preliminary step, verifying whether said key is authorized for this type of operation (also as a function of the corresponding code included in the key at the predefined position for these checks . . . ).

According to another embodiment, the key CL provided by the apparatus of the SQ service allows, the certification body, or a third-party body OT to which said SQ service has affiliated for this API (which will then transmit the collected information to the certification body), to retrieve the information necessary for the method according to the invention and concerning the SQ service, such as for example the name of the SQ service, the URL of the domain name concerned (or an application identifier on any store, of the type Apple Store or Play store as a non-exhaustive example). Other information, for example relating to the geographic coordinates of said SQ service if it is a physical store for example (information provided during the registration of SQ to the service providing its key API) can be provided on this occasion.

Those skilled in the art will understand that other variants of implementation are possible in this regard but for the sake of brevity they are not detailed here. For example, only the key is provided, and the certification body requests complementary information from the apparatus of the SQ service.

According to a $1^{st}$ variant of implementation, a correlation table included in the processing of the API program implemented at the apparatus of the SQ service makes it possible, based on the determination of the certification body corresponding to the key CL (via the series of dedicated codes within the key CL) to find the address (of URL type, as a non-exhaustive example) of the certification body that is to be queried. In which case, the apparatus of the SQ service directly queries, preferably through a secure link (for example of https type), said certification body at the appropriate address according to this correlation table by transmitting the information thereto in a standardized manner described above. This $1^{st}$ variant is faster, but requires frequent updating of the correlation table used by the various SQ services.

According to another variant of implementation, the request of the SQ service is transmitted to the third-party body OT which, after having optionally retrieved the information associated with the key KSQ API of SQ in the storage means of said third-party service OT, re-routes the request of the SQ service, as well as all the associated data retrieved from the initial request or determined via the use of the data from the API key, to the services of the corresponding certification body.

The Third Step: E3

During step E3 of the method, the apparatus 30 of the certification body CERT receives the key CL and, possibly, associated information from steps E1 or E2, identifies in its databases the user corresponding to this key, and transmits to this user a request to provide a dynamic code (for example by transmitting a validation form to this user).

This step E3 begins with the receipt, by a receiving means designed for this purpose at the certification body, of the request from the SQ service, possibly by means of the third-party service OT.

Said receiving means then retrieves and classifies the different information contained in the request:
  a) It determines the data relating to the identification of the SQ service, data provided either during the registration of said SQ service at the OT service, or directly at the certification body.
  b) It determines the type of operation requested, by analysis of the corresponding code (for example CRE for account creation).
  c) Depending on the type of transaction requested, it also retrieves the necessary complementary data (as a non-exhaustive example the amount of the request, for a payment request) and the possibly associated information (for example if it is a payment in installments, the number of times and the amount at each deadline . . . ).
  d) it also retrieves the key CL.

The transmission of this information to the certification body can be done by using various known solutions which are not all detailed here. As a non-exhaustive example, this information is transmitted via an XML form or a json file, or in Post mode from the third-party body OT to the certification body. Many other more or less secure methods are possible.

A query means of the apparatus 30 of the certification body is then operated to determine, by querying its storage means (databases for example), which user (or alias) the provided key CL belongs. The different associated information items described above are retrieved by this query means.

More particularly, in this regard all the specific data associated with the user of the key CL (the name or alias, the associated communication means . . . ) and indicated for this key CL during the preliminary step, are retrieved. Information relating to the disclosure authorizations and the various restrictions particularly in terms of use is also retrieved.

A verification means is then implemented to check the data transmitted during steps E1 and E2 with respect to the data relating particularly to the uses and use restrictions authorized for said key CL. The possible analyzes and comparisons are known and are not all detailed here.

As a non-exhaustive example, this verification means allows verification that a transaction codification associated with the key CL complies with the transaction(s) authorized for this key CL in the storage means of the certification body.

According to another example, if the key CL at the storage means of the certification body is associated with a specific site or application SA, this verification means verifies that the complementary data associated with the key CL and relating to the SQ service correspond to said site or application SA.

According to yet another example, the verification means verifies that the maximum payment of the user associated with said key CL, possibly over a given period, is not exceeded.

Those skilled in the art will know how to use known means to implement the measures indicated above and they will therefore not be detailed here, including: the comparison of descriptions and/or amounts, the reference at both sides (on the API side and on the certification body side) to a central database of the possible SQ services, etc.

If the results of the analyses and comparisons carried out by this verification means do not comply with those expected, the method is stopped and the SQ service is informed of the failure of the transaction.

In the opposite case, the method continues and a selection means allows selecting communication details associated with the key CL of the user, and possibly an associated communication means, and generates the sending to the user of a validation form.

According to another possible but less secure variant, the communication to the user is made via communication details (email, mobile phone number of the user . . . ) indicated by the user to the SQ service and transmitted by the latter during step E2.

According to one embodiment, complementary data relating to the request transmitted by the SQ service are associated with said sending. It may for example be a series of information which, during step E4, allows the user to receive an indication that the validation form is related to a request to create an account for a given service or to connect to a given service or to pay such an amount for a given service, to take the 3 examples already mentioned above.

According to another embodiment, complementary data relating to use restrictions associated (in the stored databases of the certification body) to the key CL, are supplemented to said sending. As a non-exhaustive example, if the key CL is related to a use restriction on a specific geographical area (for example related to a physical store), it may be a request to check the geolocation of the user.

The Fourth Step: E4

During step E4, the station 10 of the user receives the request to provide the dynamically generated code. For example, at his station (cell phone, tablet, etc.) the user may receive and then complete a form with a cryptogram code generated by his device DC associated with his key CL.

How the User Receives the Request for CC

There are several ways for the certification apparatus to formulate its request for a dynamic code and to present this request to the user, in particular on a user station (e.g. cell phone, PC, tablet). In the example described below, the certification apparatus transmits a validation form to the user station. It should be noted that the invention is not to be limited relative to this way of presenting the request for the dynamic code.

A receiving means allows reception of the validation form and any associated complementary data, then presentation of said validation form to the user. Many known methods allow this type of receipt and display.

According to a 1$^{st}$ example, the user receives from the certification apparatus an email including a link relating to the form. The email may itself contain the complementary information relating to the transaction.

According to a 2$^{nd}$ example, the user receives an SMS message from the certification apparatus, the email including a link relating to the form. The SMS message may itself contain the complementary information relating to the operation.

According to a 3$^{rd}$ example, the user receives on his instant messaging a message incorporating the form, and possibly the details related to the transaction.

According to a 4$^{th}$ example, like the validation forms used during some financial transactions, the API between the SQ service and the certification apparatus (possibly by means of the OT service already mentioned) cooperates so that the validation form is transmitted to the apparatus of the SQ service and displayed following (a few seconds at most) the user request on the device via which the user has formulated his request, without the latter having to open another application.

According to a 5$^{th}$ example, a form integrated into a merchant service robot (bot) is transmitted to the user. The form can merely include an input area and a validation button. Alternatively, it may include a text area recalling the context of the request (for example, request to create an account on a given service, or request to pay in 3 installments a particular amount on a given service . . . ).

Note that within the framework of online payments, one of the advantages of a method according to the invention, at least from the user's point of view, is the elimination of the minimum response time of the known methods (validity period associated with a code . . . ). An implementation similar to that of the 4$^{th}$ and 5$^{th}$ examples is particularly suitable for requests that require a rapid response. On the other hand, if the requested operation tolerates a significant delay, an implementation similar to that of examples 1 to 3 indicated above is possible (sending by email . . . ).

Request for CC Accompanied by a Request for Complementary Information

According to another embodiment, depending on different parameters provided together with the sending of the validation form at the start of step E4, the validation form is displayed only after the user's agreement to certain conditions.

As a non-exhaustive example, if a restriction on the use of the key CL is associated with a particular geographical area, the display of said validation form is conditional upon the user agreeing to access being given to his geographical position (activating the geolocation functionality if it is a mobile phone . . . ). In case of refusal, the method therefore stops at this stage.

In case of agreement, the information thus collected is transmitted in parallel with the data entered on the validation form.

Alternatively, the certification apparatus requests geolocation data of a user terminal that is physically distinct from the code generation device DC (this second terminal having been associated with the user during the preliminary phase EP or updated later, with the certification body). According to another variant, the certification body can randomly request the geolocation of the user's station or for another proof of identity (fingerprint, etc.), all this conforming to the guidelines DSP2.

Alternatively, in case of refusal, said form is displayed, but no associated data is sent at the end of step E4, which causes a denial of the request during step E5.

When the form has been displayed to the user, the latter can fill it in, using the CC code from his device DC associated with his key CL, according to the different variants of implementations of said device DC detailed in the preliminary step.

The Dynamically Generated Code

According to the state of the art the definition of the expression "dynamic cryptogram" refers to the codes called 3-digit cryptogram codes visible on the back of the bank cards on the market. Said code is composed of data (3 digits in the case of bank cards) that is not incorporated in the magnetic strip of said cards and allows, by providing them separately, to secure a transaction.

The dynamic code technology limits one of the main risks related to the online hacking of the card number and its cryptogram, by varying it per period (per half-hour, hour . . . ): a possible hacker having retrieved the different information necessary for the online payment (card number, expiry date and visual cryptogram) will indeed have a very short time to use these data before the cryptogram becomes obsolete. The method for subsequently verifying the validity of said code is explained in step E5.

How to Obtain the 1$^{st}$ Version of the Code, CC1

As a non-exhaustive example, according to the simplest implementation, the user enters the CC code currently displayed on his device DC.

Concretely, in the state of the art, bank cards with dynamic cryptograms integrate an e-paper screen (electronic paper) inserted within the thickness of this card, a mini-battery that can last 3 years (service life of these cards) and an NFC antenna. The clock-driven microcontroller generates a cryptogram every half hour. The generated code is then sent to the e-paper LCD screen and remains displayed until the next code is generated so that it can be read by the user at any time.

According to another example, the user requests the display of the code CC1 by pressing a push button in his device DC, or by scanning his fingerprint on said device . . . which triggers the calculation of said code CC1 by the device DC, and its subsequent display on the display area of said device DC.

Several code generation methods are possible and describing these methods does not fall into the present patent application. It may be, as a non-exhaustive example, a cryptogram method taking into account several data such as a card number, a timestamp and a secret shared between the card and the issuer, or even a list of pre-computed cryptograms integrated into the memory in order to reduce the cost of the device.

The device DC can be implemented in various ways, not only in the form of a dynamic cryptogram card, but also inserted into a device dedicated to the production of codes or in a dematerialized manner, for example in the form of software, code or an app downloaded from at least one personal device DP of the user such as his PC or his mobile phone, provided that said device has a 1$^{st}$ sub-means for generating cryptograms CC according to the desired specifications, and a 2$^{nd}$ sub-means for presenting/displaying said cryptograms CC to the user.

According to a preferred embodiment, however, this device is a device separate from the conventional Internet connection means, and is provided by the certification apparatus to the client. As a non-exhaustive example, the device DC incorporating cryptogram generation means and presentation/display means can thus be incorporated into a medium such as a plastic card, a watch, a ring, a bracelet, etc . . . these types of media must then have a display device allowing viewing of the current cryptogram code. The main advantages of such objects are that they can always be available and accessible by the user, separately from other means for interactions with the online services.

The operating principle is in accordance with those of the state of the art already presented above.

The generated cryptogram code can be a sequence of letters and/or digits, or even include some special characters. One of the great advantages of this method, besides the increased security of the processes using it, consists in the simplification on the user side. This need for simplification promotes the choice of relatively short sequences, for example between 3 and 6 digits and/or successive letters, like the codes generated by the bank cards with dynamic cryptogram which are limited to a succession of 3 digits (this limitation being however related to the compatibility with the 3-digit confirmation codes of other bank cards).

Trigger Means

According to one variant, the display of the CC code requires a means called trigger or pulse means (pressing a button for example) which launches the display of the code.

According to another variant, besides this display, said trigger means also controls (triggers) the generation of the CC code. The advantage of the latter variant is that, in addition to the periodic variability already mentioned above (the code changes every half hour for example, even in the presence of the trigger mechanism) there is random variability at the initiative of the user.

This variant implies the need for ensuring the synchronization between the code CC1 generated by the device DC and the second version CC2 of the code generated during step E5 at the servers of said certification apparatus on a device DCC for this key CL. The problem is therefore that, for any action (e.g. pulse) triggering a generation of a new CC code, by the device DC, the device DCC must be synchronized, so that in step E5, the CC key can be validated at the certification apparatus.

For example, if the method for generating the CC code is based on an ordered list of pre-computed cryptograms integrated in the memory of the device DC relating to the key CL, with the same list of pre-computed cryptograms available at the device DCC relating to the key CL, a drive pulse at the DC switches to the next cryptogram of the list on the user side, and this advance must be communicated in one way or another to the DCC side to preserve the synchronization. (On the other hand, there would be no impact in relation to the other CC code changes that take place according to the preprogrammed periodicity (every half hour for example): the advance in the CC codes is then done (in addition to the advances by drive pulses) synchronously between DC and DCC for said key CL).

According to a $1^{st}$ variant, in order to obtain the desired synchronization, said device DC is connected in one way or another to the Internet network according to one of the numerous known means, in order to transmit said information relating to the drive pulse (or another triggering act) to the servers hosting the device DCC. This $1^{st}$ variant involves, besides the costs and energy consumption of the communication means necessary at the DC, potential risks in terms of security, since a connection and authentication path are necessary between DC and DCC. In addition, a return channel would also be necessary in order to verify the acknowledgment of the safe receipt of the pulse at the DCC.

According to a $2^{nd}$ variant, the synchronization is managed in step E5 by a specific means.

According to a $3^{rd}$ more advanced preferred variant, a sequence of characters included in the CC code is reserved for the synchronization due to the pulses at the device DC. As a non-exhaustive example, the CC code is composed of 6 characters, the 4 first characters forming the cryptogram key CCv, and the 2 last characters forming a code CCs allowing, during step E5, the device DCC to determine the number of pulses made since the creation of the key CL. This variant will be described in more detail in relation to step E5.

These 2 last variants make it possible to discount unintentional pulses made by the user, or pulses that are not followed by the implementation of the following steps of our method.

According to a $4^{th}$ variant, a minimum period of time between 2 pulses is imposed, as a non-exhaustive example, at most every 3 seconds, this interval being able to be completed by a maximum number of pulses per unit of time, as a non-exhaustive example, a maximum of 5 pulses per minute and 40 pulses per hour. These limitations have the advantage of limiting unwanted series of pulses (for example to avoid problems related to a pulse mechanism that has remained active by mistake: said mechanism may be a button which must be pressed to generate a pulse, or a mask covering the display means which, once removed, generates the pulse . . . ). Optionally, these last limitation data could be parameterizable by the user for a given key CL.

According to a $5^{th}$ preferred variant, several keys CL use the same device DC for generating the CC code. This latter variant, besides the simplicity of use it would bring, has the great advantage of making the problems for potential hackers even more complex.

The simplicity is clear, since for all his keys CL, or for a sub group of his keys CL, the user only needs to interact with a single device generating and displaying the CC codes. This variant is possible since it has been seen above that a user having an account with the certification apparatus can request one or several different key(s) CL, each of which can be associated with different types of information which can be distinct from one key to another.

Many variants of implementation are possible for the trigger means. According to one of our preferred variants, the pulse is related to a fingerprint sensor integrated into the device DC, which has the advantage of allowing our method and system to perform a double authentication, providing an increase in security and meeting the European directive DSP2, since in addition to re-entering the code, the user must authenticate himself via his fingerprint. In which case, the fingerprint must be recognized in order to generate a pulse. It is thus possible to envisage a device including a fingerprint sensor ring: a movement of the thumb towards the ring is sufficient to place the palm of the thumb on this ring. Even in case of theft of said ring, the device DC could therefore not be operated . . . . These variants are not limited to fingerprint sensors alone; other types of biometric sensors can be used (e.g. voiceprint sensors, iris scanning devices).

The Compatibility of the CC Code with Conventional CVV Codes

Note: These paragraphs relate to the particular use case of our variant in relation to CVV codes of bank cards.

The problem in such a scenario lies in the necessity for compatibility with the online payment methods that are already in place, which incorporate the input of a 3-digit CVV code in relation to the other data of the bank card (key and expiry date). As seen above, the devices DC used according to the embodiments of the invention generate CC codes which are not necessarily composed of successions of 3 digits, but can be a succession for example of 6 or 8 digits and/or letters. In which case, by default, our CC codes would not be compatible with the 3-digit CVV codes expected for a banking transaction.

Two variants allow a solution of this problem of compatibility with the standardized systems already in place.

The $1^{st}$ variant consists in requiring that the 3 first characters of said generated code are digits. For that, it suffices to adapt the generation methods at the device DC and, on the certification apparatus side, at the device DCC.

During a conventional banking transaction, the user must limit himself to entering these 3 first digits, which are possibly displayed on the screen of the device DC in a manner different from the other characters of the series (another color for example).

Although this variant is a little more complicated to explain to users and reduces the number of available combinations, it allows the problem to be addressed very simply.

A $2^{nd}$ variant, limited to the pulse devices DC, eliminates these 2 drawbacks. According to this variant, the methods for generating said CC codes include the possibility of generating a 3-character code of digit type according to a predetermined pulse interval, for example every 4 pulses. In which case, if the current CC code displayed is not a 3-digit code, the user launches a pulse (a maximum of 3 consecutive times), until a 3-digit CC code is displayed.

A $3^{rd}$ variant mixes the 2 proposals above: every n pulses, a CC code with n characters (6 or 8 for example) is generated, the 3 first characters of said code being a succession of 3 digits, which is therefore compatible with the methods using CVV-type codes.

Note that the $1^{st}$ and $3^{rd}$ variants may require an adaptation at step E5.

Regardless of how the first version CC1 of the code is generated on the user side, it is then transmitted to the certification apparatus. According to a non-limiting example, the user copies the code CC1 onto the validation form presented to him and validates said form. The validation generates the sending of the validation result, namely the communication of said copied CC1 code associated with the key CL, and possibly also the associated complementary data, towards ad hoc means of the certification apparatus.

To ensure an authentication, the form can be combined with third-party devices, such as for example a fingerprint reading or iris analysis device, or any other information specific to the user and known to the certification apparatus (password, response to a question, etc.), whose collected information can be transmitted in parallel to those described above at the end of step E4.

The Fifth Step: E5

The method then ends with a $5^{th}$ and last step, E5, during which the certification body retrieves and then compares the first version CC1 of the CC code, received from the device DC of the user, with a second version CC2 generated at the servers of said certification body for said key CL of said user (or acquired by the certification body for example from an external device DCC). The certification apparatus compares the two versions of the code. If the two match (e.g. are identical), the certification apparatus agrees to the request, otherwise it denies it. In all cases, information indicating the result of the comparison is returned to the SQ service, possibly coupled with the complementary information.

The main operation of this step E5 consists in verifying whether the first version of the CC code provided on the user side in step E4 conforms to the one expected. To this end, the server or system incorporating the servers of said certification body should be able to verify the accuracy of the cryptogram indicated by the presumed user in step E4.

For that, it is necessary for this certification body to have, in regard to each key CL, a means and a device DCC allowing production of said code CCs associated with CL (or with a set of keys CL depending on the variant according to which a single pair of devices DC and DCC is associated with several keys CL) at a given time.

In this regard, all depends on the method used to generate CC at the device DC of the user, knowing that the same method must then be used at DCC. Reference will be made below only to the two non-exhaustive examples of methods already mentioned during the description of the step EP:

According to the $1^{st}$ example, a list of pre-computed cryptograms, with a selection of cryptograms per time step (for example every hour switching to the next code in said list) is recorded in a memory in regard to CL, the same list of pre-computed cryptograms must also be available at the device DCC in regard to CL.

According to the $2^{nd}$ example, a timestamp and a secret are shared between the dynamic code generator device and the certification body. The server accommodating the device DCC for said CL code must then be perfectly synchronized with the server accommodating the device DC of the user (in order to retrieve the same timestamp).

Note that several methods can be used at the certification body device, knowing that only one method will be implemented for a given key CL In addition to the methods, for a given key CL, the 2 devices DC and DCC must be synchronized.

In the case of simple implementations of the device DC, this synchronization is performed at the time of manufacture or programming of the two devices DC and DCC and does not vary afterwards. In this case, the device DCC allows recalculation of the code CC2 associated with CL, then compares it with the code CC1 communicated in regard to the key CL at the end of step E4. The result of this comparison is saved for the end of step E5.

As mentioned during step EP, the synchronization problem is more complex in the case of a device DC generating a CC code using a pulse means (by pressing a button for example), in an isolated manner or as a complement to the evolution by time step or the like (there is no particular problem of course if the pulse means only serves to display the current code, therefore if it is only used to save the battery, or in the variants according to which the pulse is related to a fingerprint or other biometric parameter, to secure the display).

As mentioned during the description of step EP, a $1^{st}$ variant to solve the problem of synchronization related to the generation during step E4 of the CC code using any pulse means at the device DC consists of a specific management means GS during step E5.

The implementation of said means GS consists at a $1^{st}$ sub-step in saving the code CC2-init and its respective synchronization data. These synchronization data depend on the method used to generate said code CC2-init relative to the key CL. To take the example of a method based on an ordered list of pre-computed cryptograms, this would be the position of the code CC2-init in said ordered list.

During a second sub-step, the means GS generates the next code (CC2-init)+1 for said key CL in a conventional manner using the device DCC, then compares said code (CC2-init)+1 with the code CC1 communicated at the end of step E4. If said code (CC2-init)+1 and CC1 do not match, rather than directly returning a negative response at the end of step E5, the means GS, during $3^{rd}$ successive sub-steps n, generates a code (CC2-init)+i (i=2, 3, ..., n) and compares it with the code CC1 communicated at the end of step E4, until it finds a match.

According to one variant, the number of successive sub-steps is limited, as a non-exhaustive example, to the value 100. Consequently, if no concordance with CC1 is found after n=100 $3^{rd}$ successive sub-steps, the comparison will be considered as negative (either wrong code CC1, or the device DC is faulty, which from the point of view of the processing of the request gives an identical result).

During a $4^{th}$ sub-step, if the comparison is considered negative, the specific management means GS resynchronizes the device DCC for the key CL at the code CC2-init.

If the comparison is considered positive during the $2^{nd}$ or one of the $3^{rd}$ successive sub-steps, the specific management means GS resynchronizes the device DCC for the key CL at the code (CCS-init)+i for which a match was found. The result of this comparison is saved for the end of step E5.

As mentioned during the description of the fourth step, a $2^{nd}$ variant to solve the synchronization problem related to the generation of the CC code, on the user side, using any pulse means at the device DC consists of a sub-code CCs integrated into the CC code. This code CCs could for example consist of a sequence of 2, or as a variant of 3 numeric or alphanumeric characters (beyond that, it will take a long time for the user to re-enter the code in step E4 of the method).

According to a $1^{st}$ simplified variant, the code CCs is a simple sequence of a predefined chronological order from a starting point during the creation of the key CL. For example, a sequence would start with the code J8v and the chronology would be:

For the $1^{st}$ character: Alphabetical order from J ($1^{st}$ character from the starting point) until returning to I, then increasing order from 7 until returning to 6, then reverse alphabetical order from s until returning to t.

For the $2^{nd}$ character: decreasing order from 8 until returning to 9 . . . .

And so on for the $3^{rd}$ character.

According to this variant, this information is also implemented on the devices DC and DCC relative to the key CL during the creation of said key (or during the creation of the $1^{st}$ key CL if said devices DC and DCC are common to several keys). In this case, the resynchronization is performed in a manner similar to the one indicated for the $1^{st}$ variant above using a similar means GS, but relating to the code CCs.

Such an implementation allows the management of about 175,000 distinct pulses on the basis of a sequence of 3 characters composed of digits or letters, excluding those that could lead to confusion between digits and letters. However, a check allows an increase in this capacity by detecting a return to the starting point. Although there is a relatively high possibility that the user can easily identify the sequence of codes CCs, the code CCv remains unpredictable.

Alternatively, said code CCs can, in a manner exactly similar to the code CCv, be managed by one of the possible methods for generating the code CCs (two distinct methods can be implemented for the code CCv and the code CCs). In this case, the resynchronization is performed in a manner similar to the one indicated for the $1^{st}$ variant above using a similar means GS, but relating to the code CCs.

Note that to increase the security, the codes CCv and CCs can be mixed during the display on the devices DC and DCC. For example, for an overall sequence on 6 characters, the code CCv is displayed on the $2^{nd}$, $3^{rd}$ and $6^{th}$ characters, while the code CCs is displayed on the $1^{st}$, $4^{th}$ and $5^{th}$ characters. This information must of course be known at the device DCC in order to both perform the resynchronization and verify the concordance between the code entered in step E4 and the expected code.

Still for the sake of increased security, according to certain embodiments, the codes CCs and CCv are saved on 2 separate servers, always in relation to a respective key CL (or a set of keys CL). In which case, the specific means GS is implemented at the server accommodating the sequence of codes CCs coupled with CL, and when the synchronization has been performed, the result is transmitted to the server saving CCv to check CCv in relation to the same key CL. Once the comparison has been made, the result of said comparison is saved for the end of step E5.

In the case of a negative comparison result, information on refusal of an operation or transaction is returned to the requesting SQ service, optionally with the latter having the responsibility of informing the user.

In the case of a positive comparison result, multiple particular processing operations can also be carried out to validate, or not, the operation.

As a non-exhaustive example, an operation relating to an online purchase will be agreed if the amount of credit associated with the key CL, possibly over a time slot defined at the level of said key CL, is compatible with the amount of purchase. If this is not the case, information on the refusal of the operation or transaction is returned to the requesting SQ service, optionally with the latter having the responsibility of informing the user. If so, said amount of credit associated with CL is debited by the amount of the purchase.

According to another non-exhaustive example, if a restriction on the use of the key CL is associated with a particular geographical area, a dedicated means verifies whether the geolocation data have indeed been communicated at the end of step E4 as a complement to the CC code entered by the user, and if so if they correspond to the authorized geolocation area. If this is not the case, information on refusal of an operation or transaction is returned to the requesting SQ service, optionally with the latter having the responsibility of informing the user. The means for verifying the geolocation (or a fingerprint . . . ) can be implemented on another terminal of the user.

As those skilled in the art will understand, many other complementary checks are possible and, for the sake of brevity, not all of them are detailed here.

If all the checks are positive, information on validation of (or agreement to) an operation or transaction is returned to the requesting SQ service, optionally with the latter having the responsibility of informing the user.

According to one variant, in addition to this validation/agreement information, and depending on the type of operation and the disclosure authorizations associated with the key CL, complementary information is communicated by the certification body CERT to the SQ service.

For example, for an account creation and/or an account connection/login, data associated with this account such as the last name or alias, a first name, an email . . . associated with CL are returned to SQ. One of the advantages for the SQ service is that even in a case where databases have been hacked, a potential hacker does not have access to this data if SQ did not itself store it. This SQ service does not need to make statements to bodies such as the CNIL (National Commission on Informatics and Liberty) since this service does not save personal data. The requirements related to the GDPR (General Data Protection Regulation) are also greatly simplified because the SQ services concerned do not store any personal data.

According to another example, the amount of credit remaining in the user's account after the operation is returned to the SQ service (for example if this SQ service is a financial service and the operation was a transfer or the like).

The variety of the complementary information that may be possibly released is very varied depending on the types of operations performed with a key CL and the disclosure authorizations.

During the subsequent connections, the user can log in to his account (email+password for example) in the classic way, but he will always receive a validation request by crypto code: to this end, SQ searches for the key associated with said account in its database, then queries the certification body (succession of steps E2 to E4). Therefore, if the SQ service makes sure of the uniqueness of the identifier of the user, the latter would no longer even need a password, entering the CC code associated with his key being then sufficient.

Alternatively, the user can use his key CL to log in to the account (but he must remember it).

The same procedures can be used for a payment.

Figure 4:
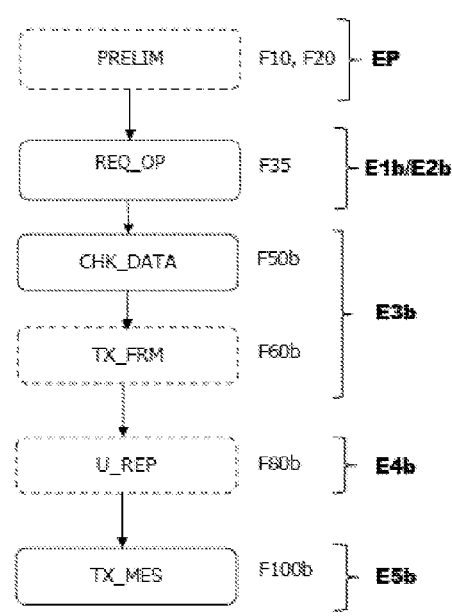
FIG. 4 represents, in the form of a flowchart, the main steps of a method for securing operations according to one embodiment of the invention, at a user station.

Referring to FIG. 4, the steps of the method implemented at a user station according to one embodiment of the invention will be described below.

The method includes a first step E1a which, from the point of view of the user station, includes a step (F30a) of formulating a request, from a user (U) associated with a key (CL) issued by a certification body, to implement an operation with a service provider apparatus. The assignment of the key CL to the user can be done during a preliminary step EP similar to the step described above. Then, there is a step of receiving (F60a), by the user station, a request for a dynamic code, intended for the user associated with the key (CL), this request being transmitted by the apparatus of the certification body. There follows a step of generating, by a user dynamic code generator device, a first version (CC1) of the dynamic code (F70) and a step of transmitting the first version (CC1) of the dynamic code to the certification apparatus (F80). At the end of the method, there is a step of receiving (F110), from the service provider apparatus, a message confirming the achievement of the requested operation.

It can be considered that step F60a is part of a step E3a similar to step E3 described above, and that step F110 is part of a step E5a similar to step E5 described above. It is therefore understood that the remarks and variants set out above with regard to steps EP, E1 and E3 to E5 generally also apply to steps EP, E1a, E3a, E4 and E5a of FIG. 4.

Figure 5:
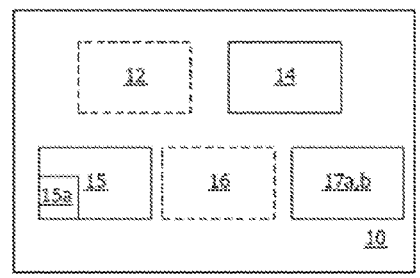
FIG. 5 represents the architecture of a user station according to the invention in one particular embodiment.
Figure 6:
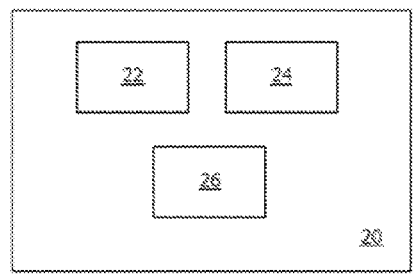
FIG. 6 represents the architecture of a service provider apparatus according to the invention in one particular embodiment.
Figure 7:
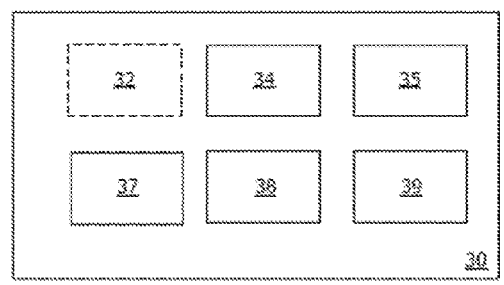
FIG. 7 represents the architecture of a certification apparatus according to the invention in one particular embodiment.

Referring to FIGS. 5 to 7, examples of the architectures of the main elements of the system 1 of FIG. 1 are presented. FIGS. 5 to 7 represent functional modules adapted to construct the user station 10, the service provider apparatus 20 and the certification apparatus 30, knowing that in reality the functionality described is typically implemented using instructions from a computer program rather than using physical modules. Furthermore, those skilled in the art will understand that the number of functional modules may be different from those represented in FIGS. 5 to 7. In other words, the functions of some modules may be distributed over an increased number of modules and/or a single module can cumulate the functions of several of the represented modules.

In the embodiment described here, the user station 10 can include the functional modules represented in FIG. 5. According to this example, the user station 10 comprises a device 12 for generating dynamic codes and a module 14 for transmitting to a certification apparatus codes produced by the dynamic code generator device 12. The station also includes a user interface 15 via which the user can formulate a request to implement an operation with a service provider apparatus, a first receiving module 17a intended to receive a request for a dynamic code from the apparatus 30 of the certification body, and a second receiving module 17b intended to receive, from the service provider apparatus, a message confirming the achievement of the requested operation. The first and second receiving modules 17a, 17b can be integrated into a single module as represented in FIG. 5.

Optionally, the user station 10 may include an actuation means 15a and a biometric data sensor 16. In the example represented in FIG. 5, the actuation means 15a forms part of the user interface 15. According to some embodiments, the dynamic code generation device 12 is configured to generate a new code in response to an action of the user, in particular the actuation of the actuation means 15a integrated into the user interface 15. The biometric data sensor 16 is then arranged to obtain biometric data of the user during his action which triggers the generation of a new code. The code transmission module 14 is then configured to transmit a valid code to the certification apparatus only if the biometric data sensor 16 validates the biometric data detected during said action of the user.

In the embodiment described here, the service provider apparatus 20 may include the functional modules represented in FIG. 6. According to this example, the service provider apparatus 20 comprises a module 22 for receiving a request, from the user U, to implement an operation, a module 24 for issuing (to the certification apparatus) a request to validate the requested operation, said request indicating the key CL associated with the user U, and a module 26 for implementing the requested operation following receipt of a validation signal from the certification apparatus.

In the embodiment described here, the certification apparatus 30 may include the functional modules represented in FIG. 7. According to this example, the certification apparatus 30 comprises a module 34 for issuing a request for a dynamic code, intended for a dynamic code generator device assigned to the user associated with said key (CL). The certification apparatus 30 also comprises a module 35 for receiving the first version CC1 of the dynamic code generated by the dynamic code generator device GC on the user side, a module 37 for acquiring the second version CC2 of the dynamic code, a module 38 for comparing the first and second versions CC1, CC2 of the dynamic code, and a module 39 for transmitting a validation signal to the service provider apparatus 20 when the first and second versions (CC1, CC2) of the dynamic code match. The module 37 for acquiring the second version CC2 of the dynamic code may correspond to a dynamic code generator device GCC. The certification apparatus may also comprise a module 32 for retrieving the data of the user associated with the key CL received from the service provider apparatus, intended for example to retrieve the verification data mentioned above.

Figure 8:
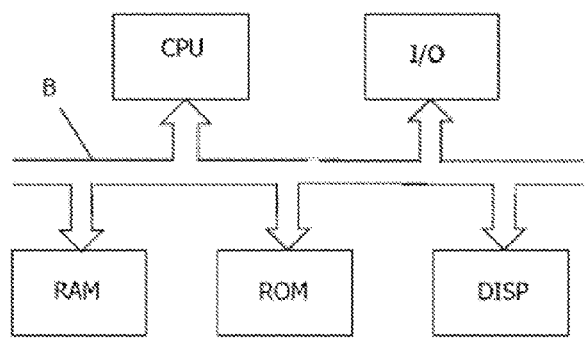
FIG. 8 represents the hardware architecture of a user station according to the invention in one particular embodiment.

As indicated above, in a particular embodiment, the different steps of the securing method are determined by computer program instructions intended to be implemented in the service provider apparatus, in the certification apparatus and in a user station, or more generally in a computer. Typically, such computers comprise the elements represented in FIG. 8, that is to say a processor CPU, a communications interface I/O, a read-only memory ROM, a random-access memory RAM and a module DISP managing the displaying at the computer (not represented), these components being conventionally connected via a bus. Of course, other conventional components can also be present.

It will be understood that various modifications can be made to the embodiments described above without departing from the invention.

For example, according to a particular embodiment of the invention, step E1 of the method is not carried out. The device SQ initiates the method from the $2^{nd}$ step E2 by requesting to validate an operation. This variant can be illustrated in many use cases including, as a non-exhaustive example, an anti-spam system, whether it is via SMS, via email or by telephone. In which case, said SQ service does not have the details of the client, but only the key CL with which different means for contacting the client are possibly associated (for example the client agrees to be contacted by email and SMS, but the corresponding details are not provided), and possibly, if the user has authorized the corresponding disclosures in the preliminary step, for each means, of the slots and/or of a maximum number of contacts per slot.

One example of the method implemented by an anti-spam system according to one embodiment of the invention is now described with reference to FIG. 9.

Figure 9:
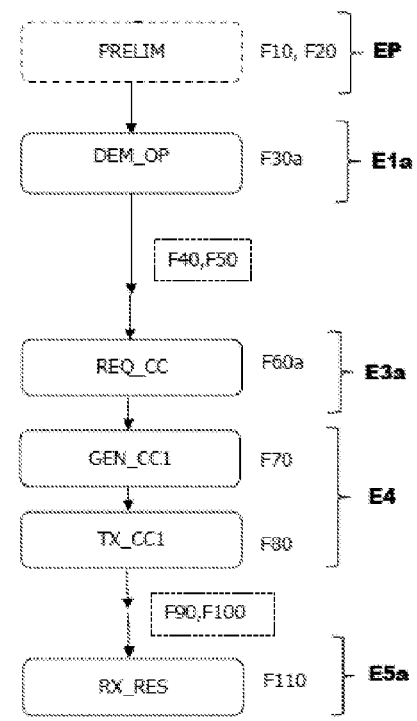
FIG. 9 represents, in the form of a flowchart, the main steps of an anti-spam method according to one embodiment of the invention.

According to the example of FIG. 9, the service provider SQ initiates the method by requesting (F35) the certification apparatus to transmit a message to the user U associated with a key CL (for example a contact by email). The request REQ_OP of the service provider SQ is issued by the service provider apparatus 20 and identifies the key CL of the targeted user. It can be considered that this step F35 corresponds to a variant E2b of step E2 described above. During a variant E3b of step E3 described above, the certification apparatus 30 retrieves (F50b) data on the user associated with the key CL provided by the service provider apparatus, for example data identifying the details of the user and verification data that can be characterized as anti-spam parameters.

The certification body CERT verifies whether the transmission of the message to the user according to the request of the service provider SQ complies or not with the anti-spam parameters associated with the user associated with the key CL. For example, the certification body verifies whether the SQ service forms part of the authorized services appearing in a list of transmission authorizations that the user has indicated in the preliminary step in regard to the concerned key CL, as well as the possibly related conditions (number of calls and/or SMS/emails . . . per period . . . ). The method is ongoing and directly switches from step E3b to step E5b, without transmission of a validation form to the user at the end of step E3b. In the case of a positive determination by the certification apparatus, the certification body agrees to the transmission, and an email/SMS . . . TX_MES is sent/re-routed while respecting the anonymity of the user (F100b).

A minimal formatting of the emails, SMS . . . , can be carried out. For example, the service provider apparatus can request the certification service to start a message with the variables First name then Last name according to a predefined formulation of the API in question and, if the certification apparatus agrees to transmit the message to the user, the certification apparatus replaces the First name then Last name variables with the corresponding data (if they are held).

According to one variant of this embodiment, if the SQ service is not included in the list of the transmission authorizations, the certification body CERT transmits a specific request to the user seeking his agreement to add the service provider SQ to the list of the services authorized to send him messages. To this end, the certification apparatus sends (F60b) a validation form TX_FRM at the end of step E3b and a variant E4b of step E4 is performed. In this case, the user during step E4b can either validate, on the form, the request to add the SQ service to the list of the authorized services by entering a confidential code CC, or deny it. The user station transmits its response U_REP to the certification apparatus (F80b). Step E5b proceeds normally with, according to the responses of step E4b, an addition of SQ to the transmission authorizations related to CL and the corresponding transmission, or else a release denial.

As a variant of this embodiment, the validation form in step E4b includes an optional input of complementary information, of the type: permanent authorizations, on a predefined slot or predefined slots, number of contacts agreed, etc. In addition, the user can, as already indicated for the preliminary step, at any time on his account with the certification body, modify the authorizations for his key CL, including the transmission authorizations, whether or not given to the concerned SQ service.

In the description above of some embodiments of the invention, some remarks refer to the transmission of the key CL from the service provider apparatus to the certification apparatus. It should be recalled that the message from the service provider apparatus can travel through a third-party body OT.

The invention claimed is:

1. A method for securing operations, the method comprising:
    formulating a request, by a user associated with a key generated by a certification body, to implement an operation with a service provider apparatus, the generated key comprising a component allowing identification of the certification body, the request including the key;
    receiving, by a user station, a request for a dynamic code, the request for a dynamic code intended for the user associated with the key, the request for a dynamic code transmitted directly to the user from an apparatus of the certification body;
    generating, by a dynamic code generator device associated with the key of the user, a first version of the dynamic code;
    transmitting the first version of the dynamic code to the apparatus of the certification body; and
    receiving, from the service provider apparatus, a message confirming the achievement of the requested operation, provided that the first version of the code corresponds to a second version of the dynamic code generated at the certification body when the apparatus of the certification body compares the first and second versions of the dynamic code.

2. The method of claim 1, wherein the generation of the first version of the dynamic code by the dynamic code generator device is triggered by an action of the user.

3. The method of claim 2, wherein biometric data of the user are detected during the action of the user that triggers the generation of a code, and wherein the first version of the dynamic code to the apparatus of the certification body is transmitted only upon validation of the detected biometric data.

4. The method of claim 1, wherein the dynamic code includes a sub-code and evolution of the dynamic code includes a progressive change of each character of the sub-code according to a respective rule.

5. The method of claim 4, wherein the characters of the sub-code are distributed among the other characters of the dynamic code.

6. A user station comprising a processor and a user interface configured to allow a user associated with a key generated by a certification body to formulate a request to implement an operation with a service provider apparatus, the generated key comprising a component allowing identification of the certification body, the request to implement an operation with a service provider apparatus including the key, the user station configured to;
receive a request for a dynamic code, the request for a dynamic code intended for the user associated with the key, the request for a dynamic code transmitted directly to the user from an apparatus of the certification body;
transmit to the certification apparatus a first version of the dynamic code generated by a dynamic code generator device associated with the key of the user; and
receive, from the service provider apparatus, a message confirming the achievement of the requested operation provided that the first version of the dynamic code corresponds to a second version of the dynamic code generated on the certification body side when the certification apparatus compares the first and second versions of the dynamic code.

7. The user station of claim 6, further comprising a biometric data sensor, wherein the user station is further configured to:
upon activation by the user, trigger the generation of a code by the dynamic code generator device obtain biometric data of the user upon activation by the user, and
transmit the first version of the code to the certification apparatus only if the biometric data detected by the biometric data sensor during activation by the user are valid.

8. A system for securing operations, the system comprising a service provider apparatus and a certification apparatus of a certification body, wherein:
the service provider apparatus is configured to:
receive a request, from a user, to implement an operation, the request including a key associated with the user, the key generated by the certification body, the generated key comprising a component allowing identification of the certification body;
issue to the certification apparatus a request to validate the requested operation, the request indicating the key associated with the user, and
implement the requested operation following receipt of a validation signal from the certification apparatus; and
the certification apparatus is configured to:
issue a dynamic code request, intended for the user associated with the key, the dynamic code request transmitted directly to the user from the certification apparatus,
receive a first version of the dynamic code generated by a dynamic code generator device assigned to the user associated with the key,
acquire a second version of the dynamic code,
compare the first and second versions of the dynamic code, and
transmit a signal indicating the validation of the operation when the first and second versions of the dynamic code match.

9. A method for securing operations, wherein the method comprises:
sending a request, by a user associated with a key generated by a certification body, to implement an operation with a service provider apparatus, the generated key comprising a component allowing identification of the certification body, the request including the key;
issuing, by the service provider apparatus to a certification apparatus of a certification body, a request to validate the requested operation, the request indicating the key;
issuing a request for a dynamic code, intended for the user associated with the key, the request for a dynamic code transmitted directly to the user from the certification apparatus;
generating, by a dynamic code generator device assigned to the user associated with the key, a first version of the dynamic code;
transmitting the first version of the dynamic code to the certification apparatus;
acquiring a second version of the dynamic code and comparing the first and second versions of the dynamic code by the certification apparatus; and
upon confirmation that the first and second versions of the dynamic code match when the certification apparatus compares the first and second versions of the dynamic code, transmitting by the certification apparatus to the service provider apparatus, a signal indicating the validation of the operation requested from the user.

10. The method of claim 9, wherein issuing the request to validate the operation comprises issuing a request including information on the requested operation, the method further comprising retrieving data of the user associated with the key, this data retrieval comprising:
retrieving verification data that indicates at least one restriction in relation to the permitted operations, and
analyzing the received information on the requested operation in order to determine whether this operation is permitted or not in relation to the verification data.

11. The method of claim 10, wherein:
retrieving verification data comprises retrieving data defining at least one restriction chosen from the group consisting of:
the type of permitted operation,
the time period during which operations are permitted,
the geographical area where, or from which, operations are permitted,
the service provider with which operations are permitted, and
the price associated with the achievement of the operation.

12. The method of claim 11, further comprising parameterizing,
by the user, restrictions defined by the verification data.

13. The method of claim 9, wherein the method further comprises, if the first and second versions of the dynamic code do not correspond, implementing an iterative process comprising:
acquiring a new version of the dynamic code,
comparing the new version with the first version of the dynamic code, and repeating the steps of the iterative process as long as the result of the comparison is negative and until a number n of versions of the code have been acquired and compared with the first version of the code.

14. The method of claim 9, wherein issuing a request for a dynamic code by the certification apparatus comprises transmitting to a station of the user a request for complementary information and the validation of the operation by the certification apparatus is conditional upon the complementary information provided by the user station.

* * * * *